(12) United States Patent
Hosken

(10) Patent No.: US 6,438,579 B1
(45) Date of Patent: Aug. 20, 2002

(54) AUTOMATED CONTENT AND COLLABORATION-BASED SYSTEM AND METHODS FOR DETERMINING AND PROVIDING CONTENT RECOMMENDATIONS

(75) Inventor: Benjamin E. Hosken, Hawthorn (AU)

(73) Assignee: Agent Arts, Inc., San Francisco, CA (US)

(*) Notice: Subject to any disclaimer, the term of this patent is extended or adjusted under 35 U.S.C. 154(b) by 0 days.

(21) Appl. No.: 09/616,474

(22) Filed: Jul. 14, 2000

Related U.S. Application Data

(60) Provisional application No. 60/144,377, filed on Jul. 16, 1999.

(51) Int. Cl.[7] ............................................. G06F 15/16
(52) U.S. Cl. ...................... 709/203; 709/202; 709/217; 709/218; 709/219; 709/224; 709/229; 707/2; 707/3; 707/5; 707/10
(58) Field of Search ................................ 709/200–203, 709/217–229; 705/7–10, 14, 26–27; 707/9–10, 1–6, 102–103; 235/375, 380, 462

(56) References Cited

U.S. PATENT DOCUMENTS

| | | | | |
|---|---|---|---|---|
| 5,237,157 A | * | 8/1993 | Kaplan | 705/10 |
| 5,678,041 A | * | 10/1997 | Baker et al. | 709/229 |
| 5,724,567 A | * | 3/1998 | Rose et al. | 707/2 |
| 5,918,213 A | * | 6/1999 | Bernard et al. | 705/26 |
| 5,963,916 A | * | 10/1999 | Kaplan | 705/26 |
| 5,991,799 A | * | 11/1999 | Yen et al. | 709/218 |
| 6,041,311 A | * | 3/2000 | Chislenko et al. | 705/27 |
| 6,049,777 A | * | 4/2000 | Sheena et al. | 705/10 |
| 6,092,049 A | * | 7/2000 | Chislenko et al. | 705/10 |
| 6,112,186 A | * | 8/2000 | Bergh et al. | 705/10 |
| 6,330,592 B1 | * | 12/2001 | Makuch et al. | 709/217 |
| 6,334,127 B1 | * | 12/2001 | Bieganski et al. | 707/5 |

FOREIGN PATENT DOCUMENTS

| | | | | |
|---|---|---|---|---|
| EP | A1 0969469 | 7/1998 | | G06F/17/60 |
| WO | WO A1 9963458 | 5/1998 | | G06F/17/30 |
| WO | WO A2 0101307 | 6/1999 | | G06F/17/60 |

* cited by examiner

Primary Examiner—Bharat Barot
(74) Attorney, Agent, or Firm—Gerald B. Rosenberg; New Tech Law

(57) ABSTRACT

A content and collaborative filtering system for recommending entertainment oriented content items, such as music and video, and other media content items to a user based on similarity in profile between the user and other users and between the content indexed in the user's profile and other content in the database. The system stores implicit and explicit ratings data for such content items provided by the users. Upon request of the user, the system accesses the user's profile and corresponding content interests database. The system uses the relationships between the content items to determine a subset of the content items to be referred to the user. The system also correlates a similarity between the user's ratings of the content items and other users' ratings. Based on the correlations, a subset of users is selected that is then used to provide recommendations to the user. The recommended items have a high probability of being subjectively appreciated by the user. The recommendations produced by the system will be represented to the user using a visual representation of the relationships between the content items allowing the user to explore the items related to the recommended items.

22 Claims, 8 Drawing Sheets

_____ WEAK RELATIONSHIP

_____ STRONG RELATIONSHIP

_____ VERY STRONG RELATIONSHIP

AUTOMATED CONTENT AND COLLABORATION-BASED SYSTEM AND METHODS FOR DETERMINING AND PROVIDING CONTENT RECOMMENDATIONS

This application claims the benefit of U.S. Provisional Application No. 60/144,377, filed Jul. 16, 1999.

BACKGROUND OF THE INVENTION

1. Field of the Invention

The present invention is generally related to the collection, processing, and presentation of alternative information source content to a user and, in particular, the selective and automated generation of source content alternatives based on content relationships and user behavioral patterns to support the recommendation of alternative content sources.

2. Description of the Related Art

There are an increasing number of typically entertainment oriented media items, such as music, books, videos, and other content sources, available for purchase by users. A currently existing system, available to at least some users, is capable of presenting the details of over 300,000 individual music compact discs alone for purchase by a user. The collection of source content is growing with the continual addition of new content titles as well as the development and adoption of new content technologies, such as MP3, digital music software. Thus, a potential purchaser faces a significant investment of time and expense to comfortably select an appropriate item for purchase.

Existing source content selection systems are quite ineffective in supporting content searches much beyond using artist, collection, and title. Users therefore typically confine their searches to just those media items that are independently known to them or are aware of through other sources of media information. These other sources are typically sufficient to provide indications of whether and which segments of the general population might appreciate particular content items. No indication is given and none can be reliably inferred as to whether a particular user will enjoy or appreciate a given item.

There is, at least for entertainment media content, some acceptance of the belief that a user's appreciation of particular content items can suggest the user's likely appreciation of other content titles. Systems built to exploit this belief have met with limited results. One known system, apparently a neural-net based expert system, determines and provides recommendation of other content titles based purely on the similarities between users without considering the relationships between the music items from a content or contextual point of view. These systems have the disadvantage that they require an initial "teaching" period where the recommendations given to users are likely to be inaccurate. Another disadvantage is that the user does not understand the reasoning behind the recommendations and therefore does not trust the recommendations. The absence of confidence in whatever recommendations are given directly reduces the utility of the system. Additionally, such systems tend to generate recommendations that reflect the lowest common denominator between broad users tastes. As a result, these systems typically provide recommendations reflecting potential appreciation within a single generic style, such as only 1980's pop music. These systems do not appear to be effectively capable of providing recommendations across a diverse range of music, such as Death Metal and Classical.

Another known system recommends particular content items based on the given content or style of the item. Such systems are generally established by hand, requiring a broad, yet detailed, understanding of each media item. Establishing even basic knowledge-based systems requires a substantial investment in time and other costs. Therefore, these systems typically employ simplistic relationships between items, such as broad categories, such as Drama and Comedy, for relating content. Since these categories contain large numbers of content items, any user selection against the categories is likely to return an also large set of recommendations and, therefore, is unlikely to be significantly useful to a user.

Finally, both of these existing systems produce recommendations that are effectively final end-points in the recommendation search. No clear ability is provided for users to explore further items related to the recommendations. Thus, the user is often left with recommendations, which are almost correct, but which don't raise the user's propensity to consume to the level required to purchase/consume the content.

SUMMARY OF THE INVENTION

Therefore, a general purpose of the present invention to provide a system that combines content-based filtering and progressively refined collaborative-based filtering to deliver a set of media item recommendations that are consistent with a user's personal media content interests.

This purpose is achieved in the present invention by providing a system and method of providing media content recommendations through a computer server system connected to a network communications system. The computer server system preferably has access to a first database of media content items including media content and related information and a media content filter identifying and providing qualifying attribute relationship data for media content items within the first database. The media content recommendations are particularly tailored to the personalized interests of a user through sequence of steps including presenting media content items through a network-connected interface to the user for review and consideration of potential personal interest, monitoring the consideration of the media content items implied through the user directed navigation among the presented media content items and user requests for related information; collecting the monitored data to develop a user weighted data set reflective of the user's relative consideration of the media content items; and evaluating the user weighted data set in combination with the media content filter to identify a set of media content items accessible from the first database for re-presentation to the user.

Thus, the operation of the present system reflects the consideration that media content items, such as music, video, and other forms of content, can be interrelated based on multiple characterizing attributes. The strength of these characterizing attributes, or similarities, is used to further define these content-based relationships, even as between quite different forms or types of media content. An additional aspect of the operation of the present invention allows for the progressive or continuing collaborative, including self-collaborative, development of such content-based relationships.

An advantage of the present invention, therefore, is that the provided combination of content and collaborative recommendation systems enables the delivery of recommendations that are particularly tailored to the personalized interests of a user.

Another advantage of the present invention is that the system flexibly determines a scope of applicable similarities between a particular and other users and recommends items within the applicable scope.

A further advantage of the present invention is that the self-collaborative relationships developed for individual users of the system permit the development of individualized recommendations even where the group collaborative relationships reflect the choices of users with highly diverse media content interests.

Still another advantage of the present invention is that the system enables multi-level media content relationship information to be captured and used as data evaluateable in providing particularized media content item recommendations.

Yet another advantage of the present invention is that implicit and explicit collaborative data is captured from and in consideration of particular users, supporting both the continuing development of both group and personal interest profiles. The implicit collaborative data is advantageously obtained from a user's self-directed actions of reviewing and considering different media content items. Thus, the selection of items to review and the length and nature of the consideration of such items inferentially reflects the user's relative interest in particular media content items. Confidence levels in the inferences drawn can also be developed and refined through the continued monitoring of user actions in reviewing and considering the same and closely similar media content items. The explicit information provided by users regarding the level and nature of their interest in different media content items provides high-confidence information that can be incorporated into the group and individualized collaborative data.

BRIEF DESCRIPTION OF THE DRAWINGS

These and other advantages and features of the present invention will become better understood upon consideration of the following detailed description of the invention when considered in connection with the accompanying drawings, in which like reference numerals designate like parts throughout the figures thereof, and wherein.

DETAILED DESCRIPTION OF THE INVENTION

The present invention operates to provide users with a source of recommendations for different media content items that may then be purchased or otherwise acquired by a user. These media content items are broadly any potentially consumable unit of content that can be characterized by content attributes. The content may be presented, sampled, used, and consumed in any of an open set of presentation formats, including audio and visual works, streaming and static pictorial images and clips, documents and reference materials alone or associated with other content. In the exemplary case of audio content, media content items may be music samples, song tracks, and albums and CDs, which may also be referred to as collections. Music videos, cover art, and liner notes may be treated as independent media content items separately consumable or as components of song tracks and collections as may be appropriate.

Figure 1A:
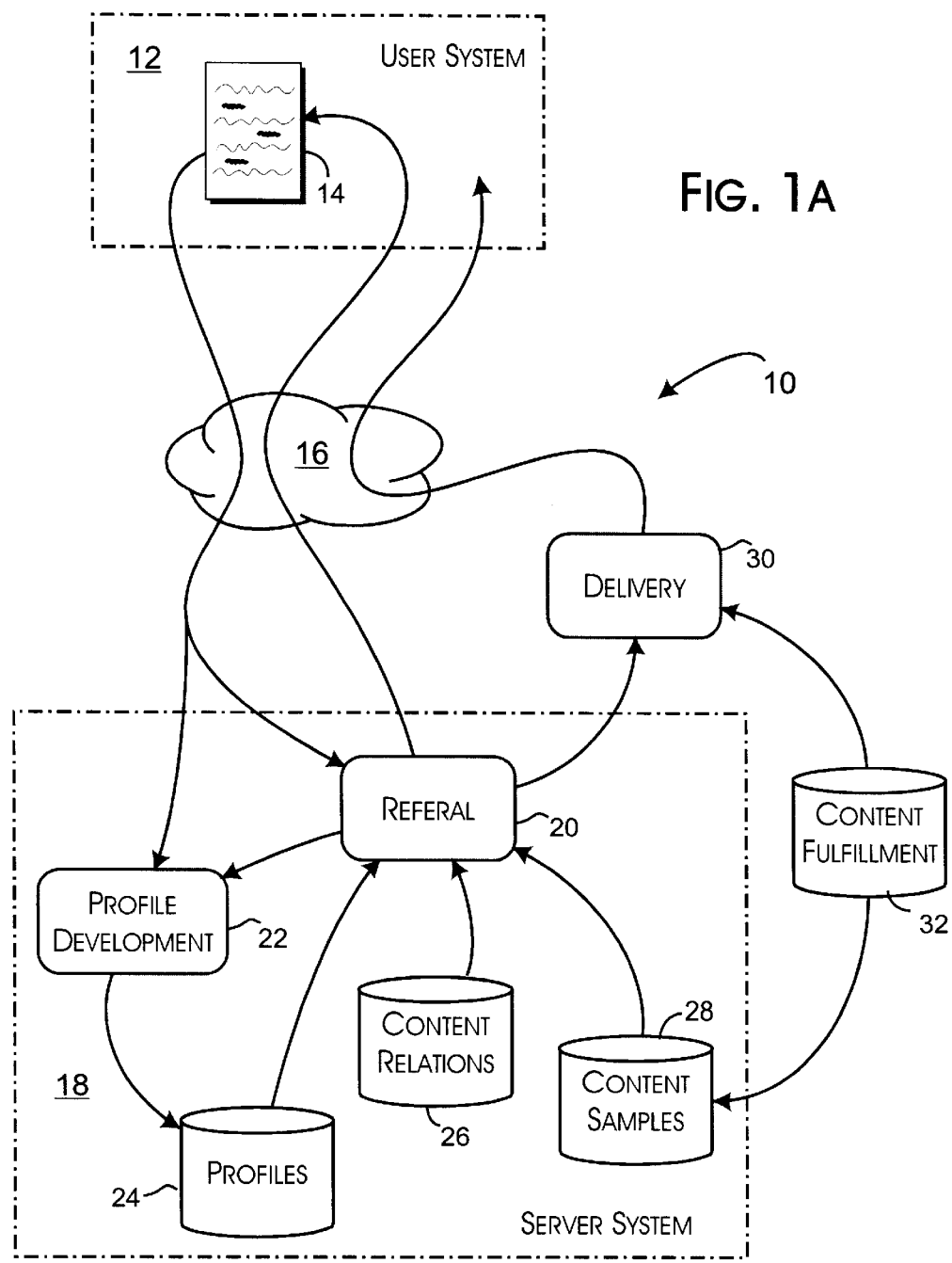
FIG. 1A provides an overview of the logical hardware and system implementation, including navigational user interface, of a preferred embodiment of the present invention.
Figure 1B:
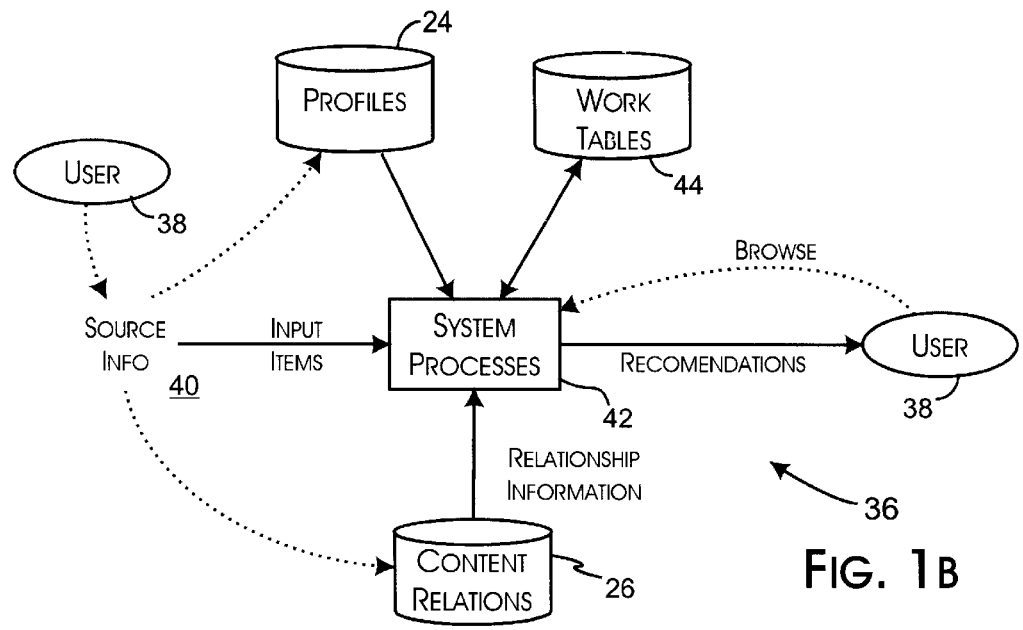
FIG. 1B provides a process overview of a preferred embodiment of the present invention.

As illustrated in FIG. 1A, a preferred embodiment 10 of the present invention provides for the development of media content item recommendations within the scope of a transaction performed over a communications network, such as the Internet. The system and methods of the present invention preferably provide for a user, operating a user computer system 12 with a network access supported interface 14, such as a conventional Web browser application, to access and navigate, via a communications network 16, through information presented by a server computer system 18. Preferably, the Web browser 14 operated by the user includes or is augmented with plug-ins and applications supporting the presentation of streaming audio and video data as may be returned from the server computer system 18 to the user computer system 12.

Recommendation and navigational requests are presented effectively by the user to a referral system 20 within the server system 18. Explicit profiling data provided by the user and implicitly derived from referral system 20 processes are preferably processed 22 and stored 24 by the server system 18. This explicit and particularly the implicit profiling data gathered is then used to provide individualizing recommendations for particular users. The profiling data collected from individuals is also preferably combined to form a collaboratively developed basis for modifying and expanding on the individualized recommendations that might be otherwise produced by the referral system 20.

In the currently preferred embodiment of the present invention, an expert compiled database 26 of content item relationship information is used as another basis for generating media content item recommendations. This database 26 preferably specifies logical connections between different media content items based on the sharing or similarity of characterizing attributes. In the case of music-type audio media content, these characterizing attributes maybe recognized as the empirically defined genre distinctions that occur between different music content items. These distinctions may be identified as belonging within some generic categories or styles, such as orchestral, blues, and pop, and perhaps within somewhat more descriptive categories, such as 1980s Dance, Rock Anthems, and Techno-Ambient Synth Mixes. The level of distinction utilized in connection with the present invention is empirically determinable, based largely on the availability of detailed relationship characterization data and the processing power and throughput restrictions of the server computer system 18.

The content item relationship database 26 preferably stores relative weighting factors that serve to establish the strength of the relationships identified in the database 26 between different media content items. These weightings, along with the establishment of the different distinguishable characterizing attributes are also preferably compiled by experts or expert systems. A preferred database 26 suitable for use with the present invention may be obtained commercially from All Media Guide, 301 East Liberty, Suite 400, Ann Arbor, Mich. 48104, a subsidiary of Alliance Entertainment Corporation, 4250 Coral Ridge Drive, Coral Springs, Fla. 33065.

The referral system 20 thus operates from a user provided request, typically identifying some media content item or artist, individual and collaborative profiles 24, and the content relations 26 to provide a set of recommended media content items that are believed likely to be of particular interest to the user. As preferably presented in the browser 14, the user may variously navigate the set of recommendations, including requesting samples of particular content items. A database of content samples 28 may be provided as part of the server computer system 18 directly or, in the contemplated preferred embodiment of the present invention, as a logical component of the server system 18 supported or hosted externally by a source provider, content management, or other party. In either event, the content samples are returned to the user browser 14 for presentation to the user. Based on the review and consideration of the recommendation set, including as applicable any presented content samples, the user may request a further search and production of a new recommendation set, typically identifying a prior recommendation media content item as part of the request, or request the purchase and delivery of a media content item.

In accordance with the present invention, the user navigation of a presented recommendation set and the user actions in reviewing and considering individual and groups of media content items are utilized in the progressive modification and refinement of the profiles data 24. The navigation events received by the server system 18 and the requests for additional information and content samples 28 are readily monitored. Other information can be derived from periods of user non-action, particularly after some media content item information or content samples is requested. That is, the amount of time spent by a user apparently reviewing some biographical information about a particular media item, or the time spent listening to a music clip provides implicit information regarding the interest level of the user in a particular media content item. By extension, this implicit level of interest can also be used to imply a likely level of interest in other media content items with similar characterizing attributes. The implicit information gathered from user actions is preferably processed 22 and stored as an addition and refinement of the profile data 24 previously stored.

Where the review and consideration of some recommended media content item prompts a user purchase decision, a user may execute an electronic purchase transaction (not shown) leading to the delivery 30 of the chosen media content item to the user computer system 12. The delivered media content item is preferably obtained from a third-party content fulfillment server or other similar service. The delivery component 30 may be implemented by a separate distribution service provider or by the content fulfillment service provider.

Figure 2:
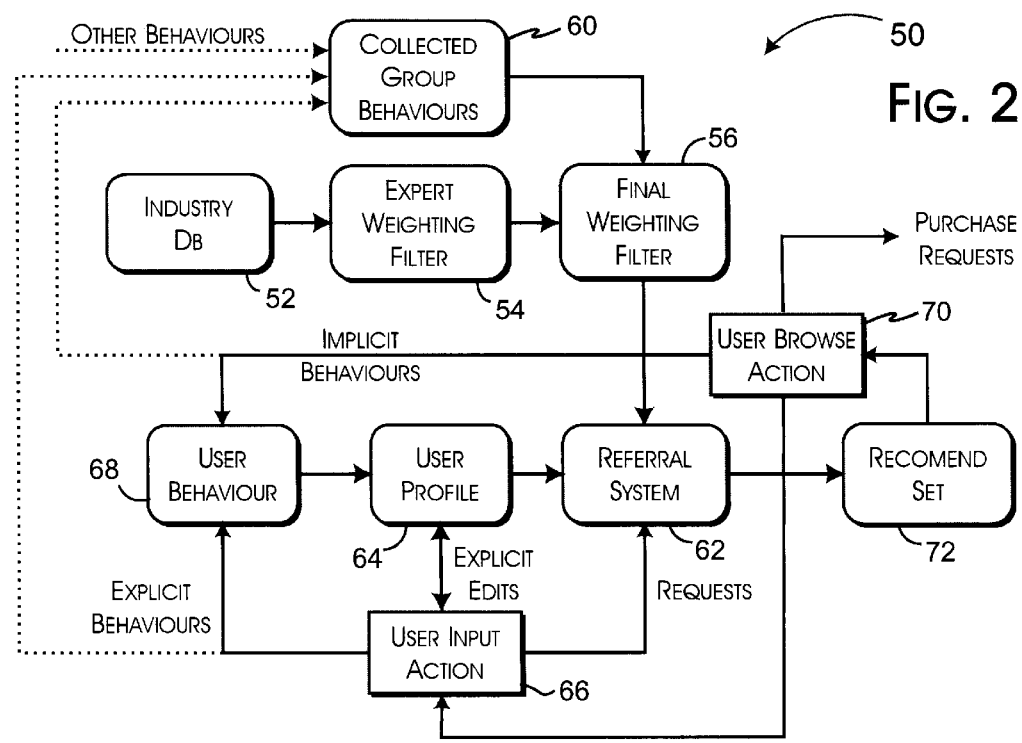
FIG. 2 is a detailed block diagram detailing the system operation of the personalized referral system implemented in accordance with a preferred embodiment of the present invention.

An overview of the process implemented in a preferred embodiment of the present invention is shown in FIG. 2. The process 36 operates to encourage users 38 to provide source information 40 as at least the initial basis for directing the production of a recommendation set. This information 40 may provide express indications of the interest level in different types and instances of media content and media content items, such as media tracks, artists, and collections. These indications or ratings are stored for both general use in connection with the production of recommendation sets for all users and specifically in regard to productions for the respective users. The ratings are preferably stored as user profiles 24.

Input requests from a user 38, such as requests to find media content in some way similar to an identified media content item, are submitted for processing through system processes 42 to produce a responsive recommendation set back to the use 38. Pre-defined content relationships 26 are retrieved and evaluated in connection with the system processes 42. The actions of the user 38 in browsing recommendation sets are also considered by the system processes 42 as reflecting, at least to some degree, the interests of users regarding particular media content items presented in the recommendations sets. These reflected and thus implied levels of interest are preferably quantified and qualified by the system processes 42 with the resulting information being incorporated into the user and group profiles 24.

In a preferred embodiment of the present invention, the system processes 42 utilize a number of work tables 44 through the process of preparing recommendation sets. These work tables 44 provide temporary and modifiable storage of intermediary relations between potentially recommendable media content items. Thus, in a preferred embodiment of the present invention, the system processes 42 may take multiple approaches to generating a recommendation set and subsequently combine the results of these approaches to produce the recommendation set presented to the user 38. Once such intermediary results approach may consider the content relationships between items the user 38 has rated as highly interesting, or enjoyable, and other items identifiable through the content relations database 26 as having similar characterizing attributes. Another intermediary results approach may concentrate first on correlating user profiles as a basis of media content items rated highly or broadly that are not identifiably known to the user 38.

In the first case, a user 38 selects a media content item known and of interest to the user from a master list of media content items. The selection is submitted to the system processes 42 for autonomous consideration against those items identifiable through the content relations database 26 that are linked by some association, such as particular or cumulatively considered characterizing attributes, to the media content item selected by the user 38. The content relations database 26 provides qualifying information, reflecting the strength or weight of each attribute relationship, as well as identifying the linking relationships. As the product of this autonomous consideration, the system processes 42 produce a set of media content items that, as considered, have the strongest relationship connections to the user selected media content item or items based on this specific evaluation approach. Preferably, this intermediary set is temporarily maintained in the work tables 44.

In the second case, the user 38 may choose a known and well-regarded media content item from a master list of media content items. The system processes 42 operate on the selection by autonomously searching through the available users profiles 24 with the purpose of identifying those profiles reflecting similar ratings of media content items rated by the user 38. The identified profiles are then correlated against the profile of the present user on the basis of the commonly rated media content items. Preferably, these correlations may be represented as vector relationships, which are stored in the work tables 44. The vector relationships are preferably then used as a basis for predicting the likely interest level of the user 38 to other media content items not rated by the user 38. The degree of profile correlation and the relative strength of the relationships between the media content items known and apparently unknown to the user 38 aid in defining the likely level of interest represented in the vectors. This further processing preferably results in the generation of intermediary data sets temporarily maintained in the work tables 44.

The intermediary result sets produced by these and any other intermediary approaches to generating the final recommendation set are then considered as a group by the system processes 42. The intermediary sets are preferably joined and autonomously ordered based on any number of factors, potentially including frequency of inclusion in different intermediary sets, the relative order of media content items in the different intermediary sets, and the attribute related strengths of the inter-relationships between the media content items.

Once the intermediary sets are joined and correspondingly ordered, the system processes 42 may trim the resulting recommendation set list to a manageable number and present the recommendations to the user 38. The presented recommendation list is preferably stored temporarily in the work tables 44. A history of the recommendation sets presented to a user may also be recorded in or stored in connection with the user profile. Additionally, the level of interest in particular recommended media content items, particularly as can be inferred through the browsing of such recommendations in accordance with the present invention, is stored as part of the user profile. Thus, the media content items considered or reviewed in connection with the user browsing actions are at least implicitly rated by the user and stored to the user profile, which substantially extends and enhances both the individual and group-oriented basis for correlating user profiles. As user profiles are so extended, the effectiveness of the system processes 42 in generating recommendation sets improves.

For a preferred embodiment of the present invention, multiple data tables within the work tables 44 are employed to store information used in formulating content-oriented and collaboration-oriented media content item recommendations. While other logical data representations can be readily used, the following table organized representations are preferred.

TABLE I

Data Tables

| Table | Description |
|---|---|
| 1. Favorites | Internally stores identifying information about media content items selected and/or rated by a user including rating weight and rating confidence information. For example, an external representation of this table or a set of such tables may be used to store particular media content items, user lists of artists and collections of interest, and other tables generally organized by the user to reflect characterizing attributes of media content items and set of such items that are of some particular interest to the user. Preferably, an in-memory temporary table with persistent database storage. |
| 2. Target Clusters | Internally contains categorization details of user groups preferably on the basis of the strength of interest relative to some distinguishing characterizing attributes. This information can be used as an index to improve the performance of collaborative-oriented intermediary production of media content item recommendations. Preferably, an in-memory temporary table with persistent database storage. |
| 3. User Profile | Internally contains identifying information reflecting the information contained in user profiles, including characterizing attribute and media content ratings, for the media content and media content items linked to a user. The information in this table is preferably derived from explicit rating information provided by the user and through implicit observations performed by the system against user browsing actions. Preferably, an in-memory temporary table with persistent database storage. |
| 4. Results | Internally contains favorite, target cluster, user correlation, collaborative, and content results data generated in the process of identifying potential recommendations and final results data determining a recommendation set that may be presented to a user. Preferably, an in-memory temporary table with persistent database storage. |
| 5. Content Relations | Contains linking and weighing information for characterizing attributes of media content items, including for example in the case of music oriented media content items, artist, tracks, collections, and genres. Preferably, an in-memory temporary table with persistent database storage. |

When a user provides a request to the processing system 42, the working in-memory tables, including the final result tables, are cleared. Recommendations are then determined based on the Favorite media content items identified by the user, employing the content database and the user profiles tables. The recommendations are then stored in a final results table. The media content items in the final results table are then preferably sorted using the weights of the characterizing attributes as a key with the output list of sorted items being displayed to the user. In a preferred embodiment of the invention, the output of media content items are presented on a user accessible display, such as presented by a personal computer monitor, kiosk display, personal organizer touch pad screen, mobile phone display, and other communications connected informational screens.

A detailed view of the structure of a preferred embodiment of the present is presented in FIG. 2. The logical system architecture 50 of the referral system preferably operates from one or more industry databases 52 that contain lists and information regarding available media content items. A music-oriented industry database would typically contain lists of singles, albums, CDs produced by artists and other organizations. Biographical information on listed artists and liner notes and pictures for particular media content items may be included. Media clips and content samples, tour poster images, and other images and documentation may also be included or referenced in other, potentially third-party databases.

An expert weighting filter 54 provides a logical map of the various items listed in the industry database 52 relating and providing weighting factors for those items that share characterizing attributes. The map data is preferably stored as sets of one or more binary relations qualified by weighting values. The map data for a music track might include:

| | |
|---|---|
| {Artist$^1$ <=> Tract$^A$(1.0)} | {Tract$^A$ <=> Movie$^5$(1.0)} |
| {CD$^X$ <=> Tract$^A$(1.0)} | {Artist$^1$ <=> Collection$^M$(1.0)} |
| {Orchestral <=> Tract$^A$(0.6)} | {Artist$^1$ <=> Artist$^2$(0.4)} |
| {Artist$^1$ <=> Orchestral(0.1)} | {Orchestral <=> Tract$^A$(0.6)} |
| {Artist$^1$ <=> 1990 Blues(0.8)} | {Artist$^1$ <=> 1980 Soul(0.7)} |

A map weighting value of 1.0 preferably indicates a fixed relationship: a particular artist recorded a particular track. Although a weighting value is assigned, such relations are definitionally just binary relations. Lesser weighting values, which characterize weighted relations, represent a subjective expert opinion on similarity. Thus, this map can therefore be used to selectively filter media content items listed in the industry database 52 based on particular characterizing attributes and further qualified, optionally, by a minimum weighting value.

A final weighting filter 56 is preferably used to combine the product of the expert weighting filter 54 with group behaviors 60 that are collected from the users of the system 50 and behaviors obtained from other sources. In the preferred embodiment of the present invention, the group behaviors reflect the consideration and review of different media content items collectively by the users. Preferably, these behaviors are represented in the final weighting filter 56 again as a map constructed of binary relationships between characterizing attributes of media content items qualified by weighting values. The further filtering performed through the final rating filter 56 thus effectively implements a collaborative function reflecting the values and interests of the user community resulting in a desirable, though preferably attenuated, bias in the selection of the recommendation set produced by the system 50.

The other behaviors collected as part of the group behaviors 60, when used, is preferably derived from externally generated polls, rankings and ratings of different media content items. These external behavior sources may include weekly and other top-ten lists of popular media content items, published reviews of significant new artistic works, current sponsorship programs, and advertising. In each of these cases, the information provided by these sources is externally resolved into a form that, processed through the collected group behaviors 60, may be applied as a filtering map with the collected user behaviors against the product of the expert weighting filter. Over time, the final weighing filter may therefore effectively subsume the function and even operation of the expert weighting filter 54.

The product of the final weighting filter 56 is prepared and provided as one of two information inputs into a referral system 62. The second input is obtained from a current user profile 64 created by the current user. That is, whenever a user logs in or is otherwise identified to the system 50, the user profile 64 is accessed from the profiles database 24. The user profile preferably contains data representing the characterizing attributes of media content items that are personally of interest to the user. This data is used to define the subjective relative rankings of particular artists, genres, and media content items as viewed by the user. Preferably, however, this data is ultimately stored in the user profile 64 again as binary media content relations.

Figure 3:
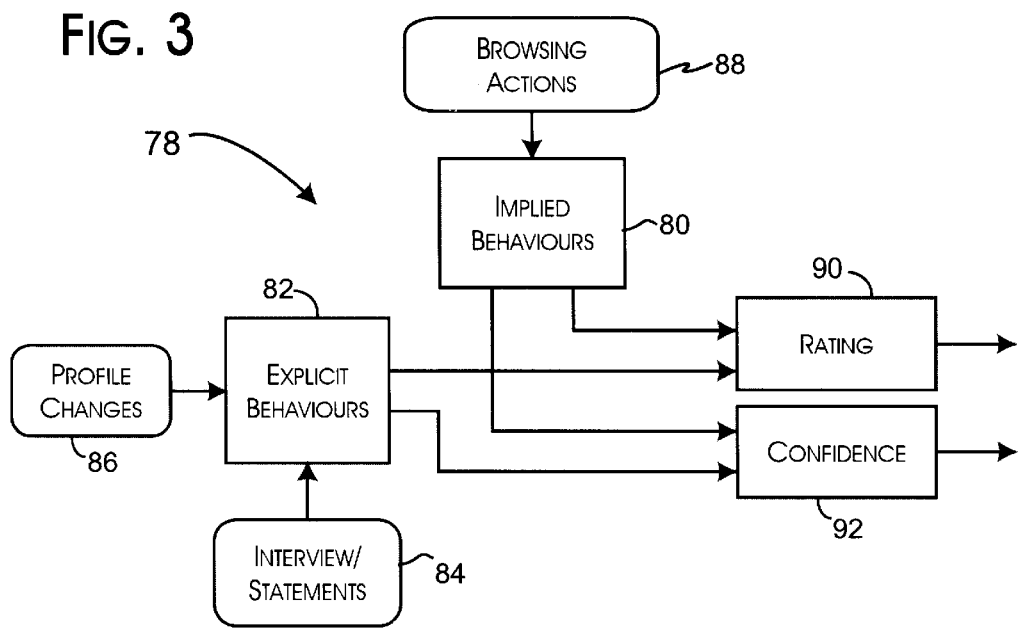
FIG. 3 provides a block diagram detailing the collection and compilation of behavioral data in accordance with a preferred embodiment of the present invention.

While some aspects of the user profile 64 may be edited directly 66, including specific statements of user identity and specific interests in different media content and content items, much of the user profile 64 is preferably obtained from a user behaviors 68 analysis. User actions, obtained by monitoring direct user input actions 66 and user browse actions 70 in navigating recommendation sets 72 are preferably examined to identify general and particular interests of the user and gauge the relative strengths of these interests. As generally shown in FIG. 3, a behavior analysis system 78 collects explicit and implied behaviors from the user. Explicit behaviors are defined as direct actions taken by a user that directly identify a level of interest relationship between characterizing attributes media content items. As such, an empirical selection of explicit behaviors can be identified as reflecting the most direct indications of user interest. In a preferred embodiment of the present invention, the explicit behaviors monitored and analyzed in connection with the development of user profiles are listed in Table II.

TABLE II

Explicit User Behaviors

| Activity | Description |
|---|---|
| 1. Interviews | On initial establishment of a user profile, a user may elect to be interviewed or surveyed to collect information helpful in constructing an initial profile. |
| 2. Ongoing Ratings | A specific ratings request presented whenever a particular content item is considered by a user; provided to allow the user to continually update and refine the user's profile. |
| 3. Rating of Specific New Content | Spot-light type quick rating poll presented to user regarding new or special content items. |
| 4. Review Ratings | Rating of perceived value of opinions expressed by particular analysts, periodicals, and other information resources. |
| 5. Post Purchase Ratings | Prompted rating of prior content purchases. |
| 6. Profile Changes | Edits and specific changes made to the user profile. |

As indicated in FIG. 3, the user may be interviewed, surveyed, and variously questioned initially and on an ongoing basis 84 to obtain direct statements of user interest in specific media content attributes and content items and the relative strength of these interests. Preferably, user directed edits of the user profile are also supported 86. To support these edits, the user is preferably presented with a representation of the interest relationships stored in the user profile 64, allowing the user to adjust the relations including, in particular, the weighting values of the displayed relations.

Implicit behaviors monitored and analyzed are likewise identified empirically, though primarily from the actions a user makes in navigating a recommendation set 88, including reviewing and considering individual and groups of the media content items recommended. The implicit behaviors 88 recognized from the monitored and analyzed browsing actions 88, in a preferred embodiment of the present invention, in support of the ongoing development of user profiles, are listed in Table III.

TABLE III

Implicit User Behaviors

| Activity | Description |
|---|---|
| 1. Searches | Items and criteria specified as search parameters |
| 2. Pre-Screening | Items listened to or viewed. |
| 3. Document Review | Artist and Collection descriptions reviewed |

TABLE III-continued

Implicit User Behaviors

| Activity | Description |
| --- | --- |
| 4. Content Reviews | Viewing of reviews by analysts |
| 5. Purchase Actions | Items added to a purchase list, gift list, and actually purchased. |
| 6. Adding to List | Items added to wish and reminder lists |
| 7. Browsing Time | Time spent in connection with particular Items, collections and genres |

These implicit user behaviors 80 are analyzed to identify media content attribute and media content item interests implicitly expressed by the user through browsing activities. Preferably, the result of this analysis is again a set of binary relations between characterizing attributes of media content items and a relative weighting of the relations representing the strength of the interests.

The binary relations and weightings produced from the explicit behaviors 82 and implied behaviors 80 are represented as ratings 90 that are then stored in the user profile 64 within the profile store 24. In a preferred embodiment of the present invention, the ratings are represented as normalized values within a range of 1.0 to −1.0, inclusive.

Preferably, confidence levels 92 are also produced with the ratings 90. For explicit behaviors 82, the confidence level is generally represented as a normalized 9.0 value. For implied behaviors 80, the confidence level is itself a product of the user action analysis. Thus, confidence levels for implied behaviors are empirically-based reflections of the certainty that the monitored user actions represent an interest, and the determined strength of that interest, by a user. Normalized, the confidence levels for implicit ratings are preferably in the range between 9.0 and 0.0.

Confidence levels are preferably produced and used subsequently in connection references to the user profile 64 by the referral system 62. These confidence levels are preferably also maintained for general use as part of the collected group behaviors 60.

While the expert weighting filter 54 may also include confidence level data for the relationships established as part of the filter 54, preferred embodiments of the present invention do not utilize such confidence data. Rather, the weighted relations data provided by the expert weighting filter is accepted as provided with any subsequent modifications, by whatever party maintains and updates the expert weighting filter 54 data, as representing any changing in the weighted relations over time.

Conversely, the present invention recognizes the potential for change in user interests over time by progressively reducing the confidence levels associated with at least the user and group implied behavior ratings. The rate of progression is again empirical, though subject to testing based on the variance in user actions that support the continued rating and confidence level of particular evidenced interests. Consequently, the active use of the system 50 over time enables the user profile 64 to remain as a close reflection of the user interests, even as those interests may change over time. Equally, interests incorrectly presumed to exist through implied behavior analysis are unlikely to be repeated or to be repeated frequently, resulting in the confidence levels associated with those ratings to be downgraded over time.

Figures 4, 5:
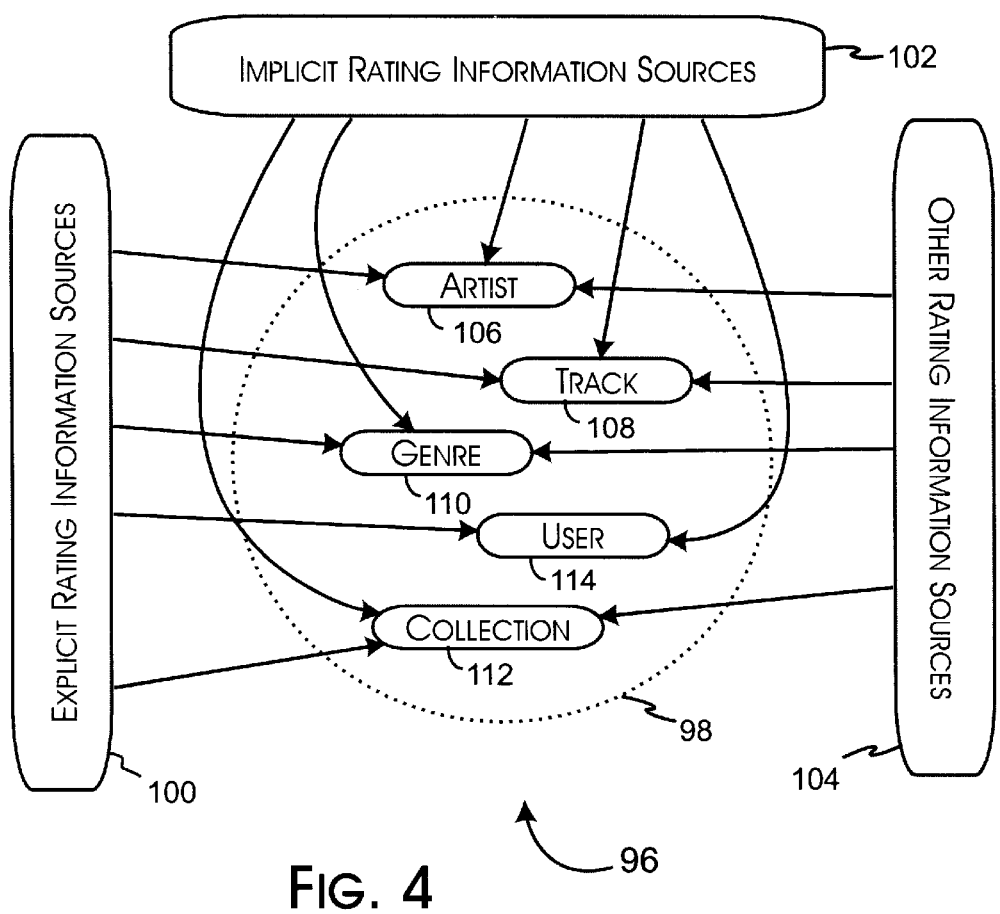
FIG. 4 illustrates the collection and correlation of information gathered from multiple information sources as may be utilized to establish profiles of individualized and group behaviors as a basis for determining and providing recommendation sets in accordance with a preferred embodiment of the present invention.
FIG. 5 provides a representation of corresponding portions of individualized user profile data sets reflecting the strength and confidence of relationships between particular media content items and users.

Referring to FIG. 4, the resulting set of user profiles 24 can be viewed as a pool or sparse matrix 96 of interrelated characterizing attributes derived from explicit, implicit and other direct rating information source 100, 102, 104. Preferably, the relations are further separately identifiable by identifications of the individual users who have profiles 64. Another view of the sparse matrix 96 is shown in FIG. 5. The cells of the matrix 96 store data for combinations of users and particular characterizing attributes. Here, specific instances of collections ($Co_N$), tracks ($Tr_X$), artists ($Ar_Y$) and genres ($Ge_Z$) are correlated against the ratings and confidence levels of individual users.

Again referring to FIG. 2, the portion of the sparse matrix 96 corresponding to the current user of the system 50 is presented as the current user profile 64 to the referral system 62. In response to a user request action, the referral system 62 produces a recommendation set 72. The form of these requests may be varied. Each request as made presentable by a current user, however, preferably identifies some basis or starting point for the media content items 52 known to the system 50 to be refined into a recommendation set 72. Preferably, a user request action identifies a media content item to the system 50. Other request types, are listed in Table IV.

TABLE IV

Request Types

| Basis | Description |
| --- | --- |
| 1. Media Content Item | provide a set of recommendations based on or similar to a particular media content item consistent with the user profile. |
| 2. New Dance | provide recommendations of new releases in the Dance genre consistent with the user profile. |
| 3. Top Ten Pop Tracks | provide recommendations of media content items similar to the current top ten pop tracks that are consistent with the user profile. |
| 4. Re-Releases | provide recommendations of recent re-released collections based on or consistent with the user profile. |

Figure 6:
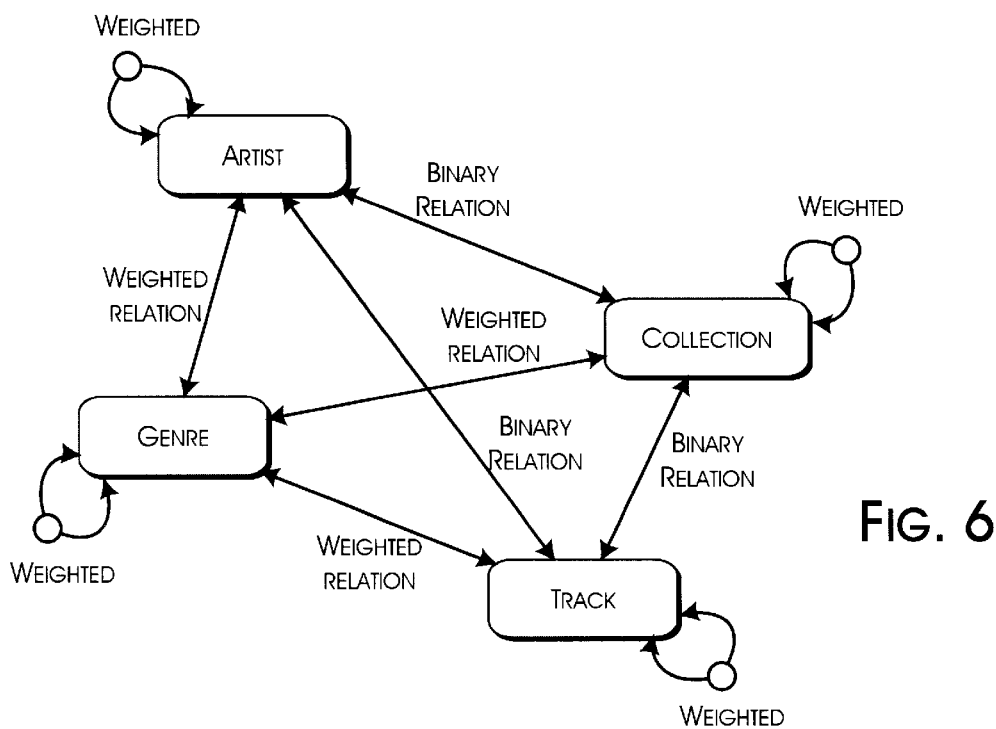
FIG. 6 is a graph representation of the media content characterization attribute network utilized in accordance with a preferred embodiment of the present invention to develop individualized media content item recommendations.

As illustrated in FIG. 6, the referral system 62 operates preferably as a graph traversal system over a data set collectively constructed from the user profile 64 and the product of the final weighting filter 56. Specific relations that are fixed as one-to-one, such as between an artist and a particular track, are defined as binary relations. Other, in effect, subjective relations are weighted relations. The value of the weighted relations are specific to the particular characterizing attributes related, such as between different tracks and between an artist and a specific genre.

Based on the weighted relations between different characterizing attributes of the known media content items, a traversal of the data set can be made from any request identified starting point to a set of the most strongly related other media content items. Thus, a request to identify a media content collection similar to a given track may result in a graph traversal: $Track_1 \rightarrow Artist_1 \rightarrow Genre_A \rightarrow Artist_2 \rightarrow Tracks_2 \rightarrow Collection_X$, where each step of the traversal is qualified by the weighted rating and confidence level of the step. Each completed traversal therefore has a final computed rating and confidence level. The weighting value accumulated for traversal steps are derived from the corresponding, if any, weighted relations given in the sparse matrix of the user profile 64 and the relation weightings provided from the final weighting filter 56. Preferably, an empirical normalization is applied by the referral system to correspondingly balance the relative significance that is placed on weightings provided separately by the user profile 64 and final weighting filter 56. In similar manner, an empirical normalization is applied by the final weighing filter 56 relative to the weightings received from the collected group behaviors and the expert weighting filter 54. Thus, normalized, traversals that complete may then be ranked and sorted based on whatever criteria selected by the user, whether alphabetically by artist, total strength rating, or level of confidence.

Traversals that are not completed can be the result of an accumulated rating and confidence level falling below a defined threshold. Other traversals may not be completed once they exceed a defined limit in the number of steps.

Based on the presented recommendation set 72, the user is enabled to browse 70 the identified set of media content items and present a new request to the system 50. This new request may be independent of the recommendation set 72, though preferably is based on some characterizing attribute of the set 72. Thus, in reviewing and considering the individual merits of the media content items within a recommendation 72, the user may reference a media content item or characterizing attribut of the item for use as the basis for new request and generation of a corresponding recommendation set 72. This cycle may be repeated, each time providing additional information refining the user profile 64 as to the interests of the user and deepening the search for media content items that are of particular interest to the user.

Figure 7A:
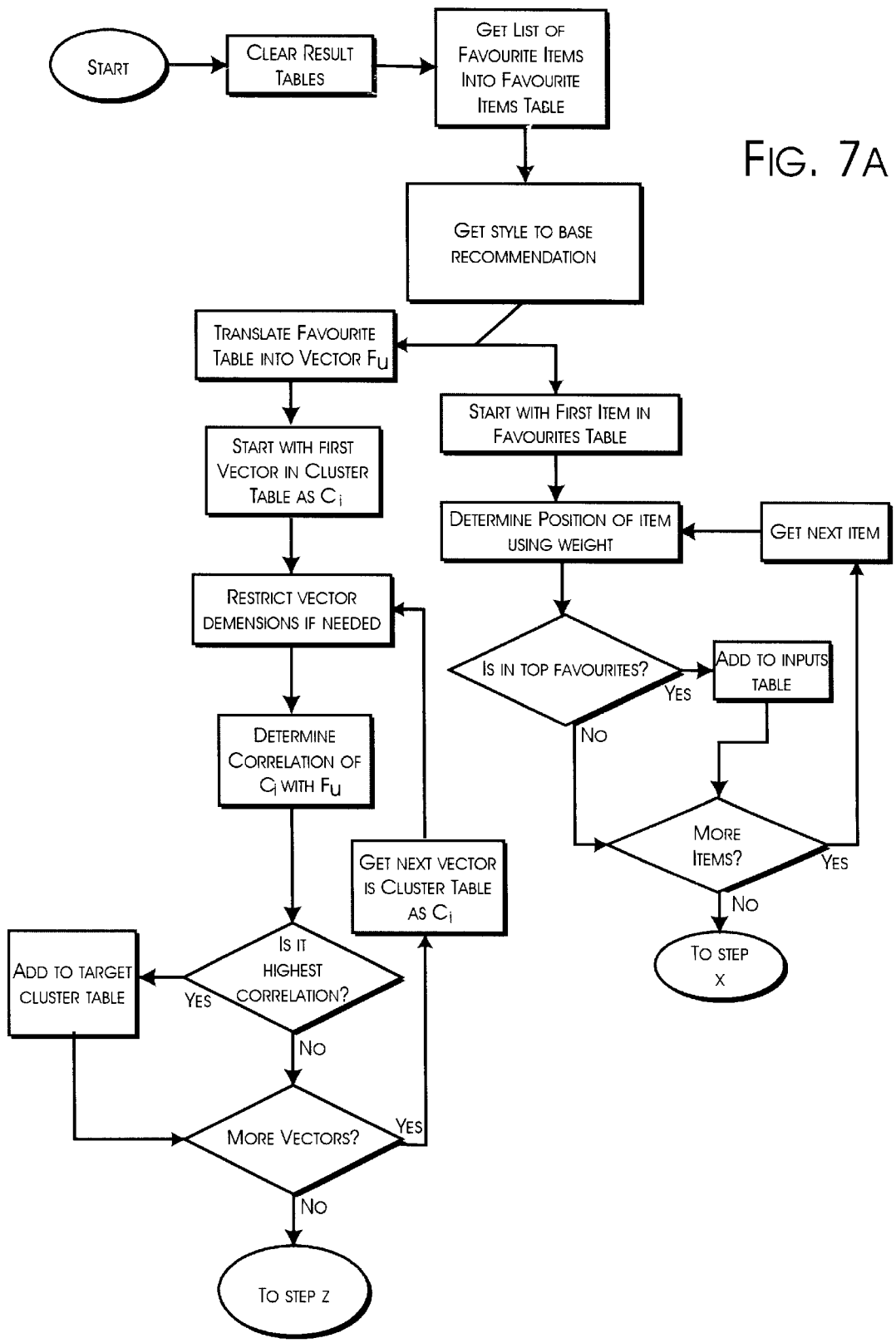
FIGS. 7a, 7b, 7c, and 7D provide flowcharts of a preferred system operation, detailing the collection and processing of user input and the presentation of resulting recommendations back to the user.
Figure 7B:
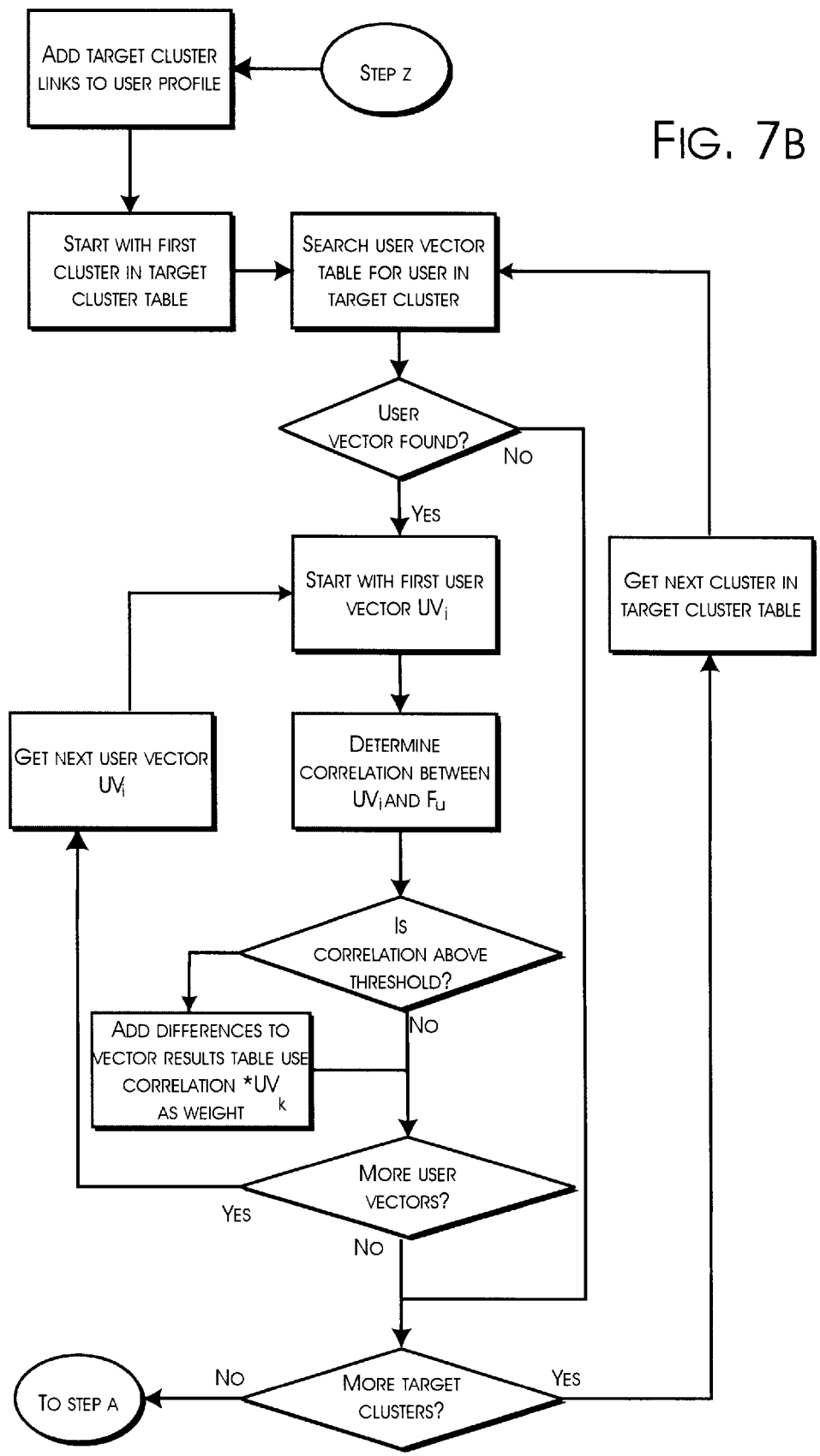
Figure 7C:
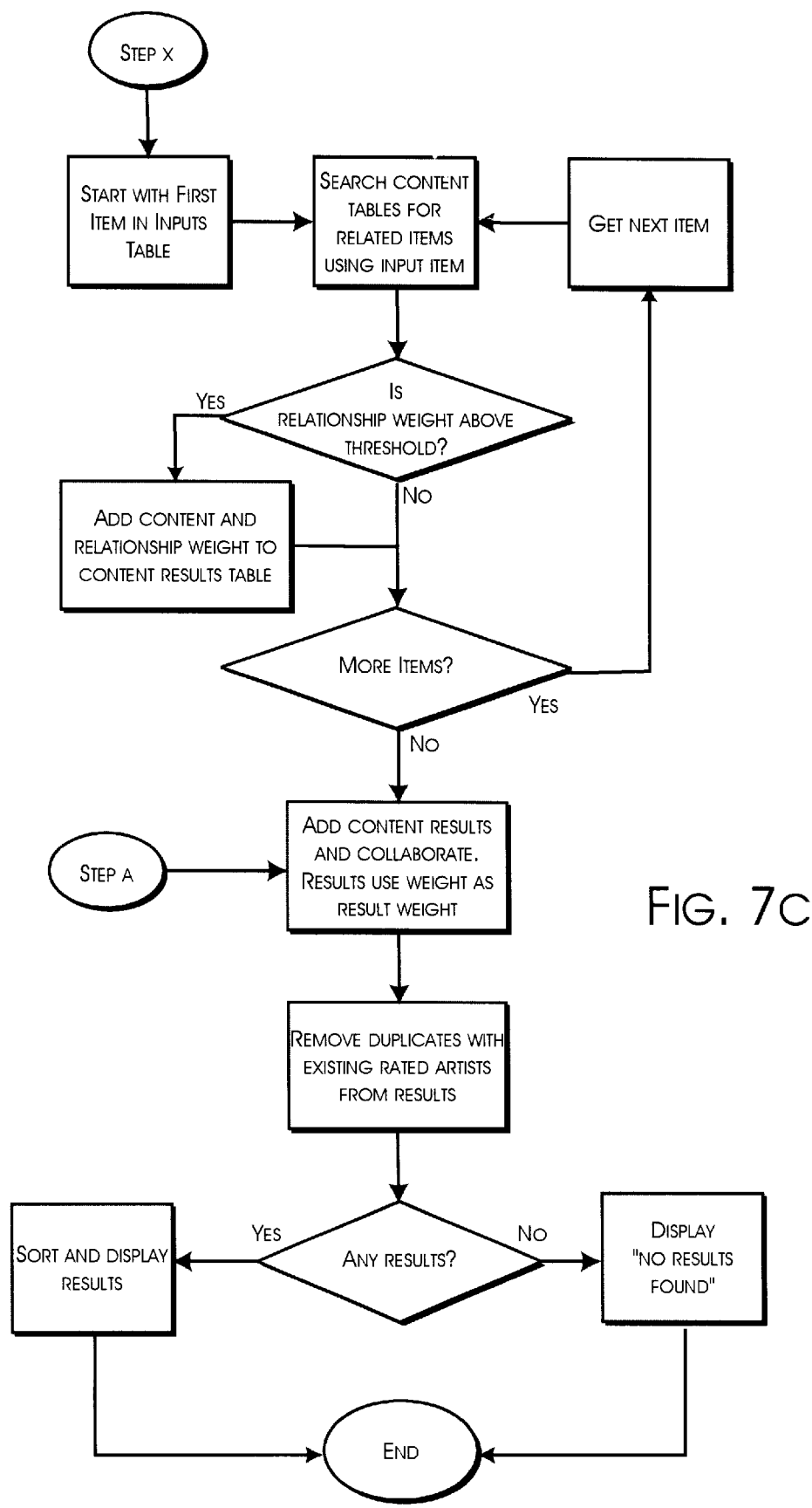
Figure 7D:
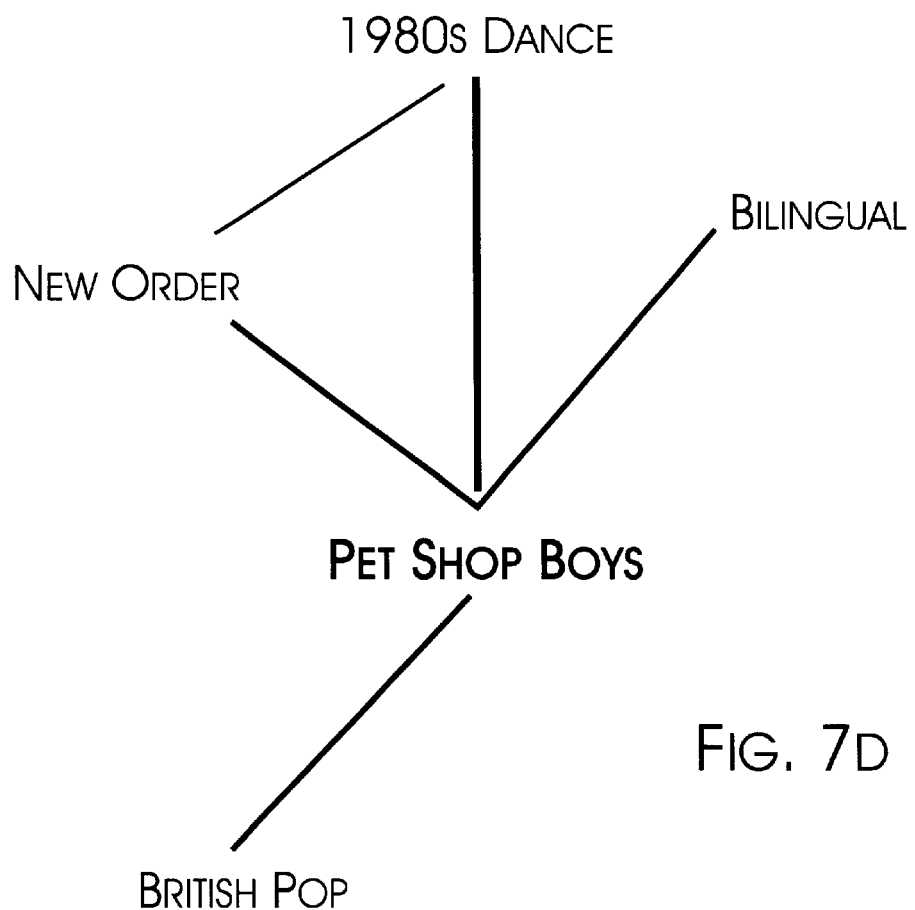

Finally, FIGS. 7A, 7B, and 7C present a flowchart for the overall system 50 for making recommendations to a user according to a preferred embodiment of the invention. FIGS. 7A, 7B, and 7C show the logic flow that the system 50 follows to accept input from and provides results to the user of the system. The examples below illustrate the operation of a preferred embodiment of the present invention to provide a music recommendation service.

EXAMPLES

The preferred uses of the system can be grouped into two main classes. The first class relates to uses where the system assists the user in narrowing down the number of choices that the user is faced with, at which point the user begins exploring the recommendations and related items using the navigation aids provided by the system before selecting an item to purchase or consume. An example of a use of this first group would be to help users identify compact discs that they may be interested in purchasing. The system would suggest a list of compact discs, and the user would then look at the details of the albums individually, and may listen to some preview samples of the tracks on the album. Alternatively, the user may navigate to related items (albums, artists, genres etc.) using the relationship navigation tools. Either way they would eventually decide on which item to purchase based on the information provided to them.

The second class of possible uses is where the user makes a purchase (or consummation) of a media item recommended by the system based solely on the system's recommendation. In this scenario, the user demonstrates enough trust in the service to accept the automatically generated recommendations. A further example of this class of use is the recommendation of music content that would be automatically purchased and played to the user on a track-by-track basis. Unlike pure collaborative-based systems, the invention described would bootstrap its knowledge with minimal preference information (a single album liked) using the relationships inherent between content items using prescribed attributes such as genre, artist, year etc.

In both classes of examples, the user would be able to provide feedback to the system regarding the recommendations indicating the degree to which the user liked the recommended item.

The following is a demonstration of the operation of the system as it might be implemented for a database of music albums that are available for purchase from an online fulfiller. It tracks the operation of the system from the initial user preference input through to the recommendation of music items being provided to the user.

First, the intermediate tables are cleared of data relating to the user recommendations. This occurs automatically and requires no input or intervention by the user. The user is then prompted to enter their favorite music items into the system. The user may have previously entered the information into the system. The number of items entered may be one or more items. The user may explicitly enter music items and ratings using a form style interface or the system may derive implicit ratings of music items based on system-based observations of user actions. The music items may include but not be limited to artists, albums, genres, and tracks. The music items may be specific to a group of related styles of music such as pop, easy listening and dance/pop or they may be across unrelated styles such as pop and death metal. In the first case the system will recommend music items in the group of related styles. In the second case, the system will prompt the user for the style of music to be used for the basis of the recommendations. The system would then restrict the recommendations to styles closely related to the users selected style. The ability for the system to automatically detect diverse musical tastes will enable the system to support the delivery of recommendations based on the user's currently desired style. For example, the user may request different music for a dinner party than when playing video games.

The system checks if a restriction is required. If it is, the system loops through the favorites table and removes any items, which does not relate to the style selected by the user.

The system splits the processing into two streams, the content recommendation and the collaborative recommendation streams.

Content Recommendation

The system accesses the first item in the user's favorites table, in this case the artist Pet Shop Boys. This item has a rating of 9 out of a possible 10.

The system compares the item's rating with the current best, set initially to zero as no items have been processed. As it has a higher rating than the current highest rating, the system adds the music item to the content inputs table.

It then checks if there are more items in the user's favorites table. There are two remaining items, New Order (6) and The Cranberries (6). Both have a lower rating than the first item and thus would not be added to the content inputs table. It is possible that the restriction of the number of items in the inputs table could be increased from one to more items (possibly three to five) to give the system a larger range of items to base the recommendations on.

After processing the remaining two items, the system determines that no more items remain in the favorites table. At this point, the system has a content inputs table containing Pet Shop Boys with a rating of 9.

The system then accesses the first item in the content inputs table. This item is the Pet Shop Boys with a rating of 9.

The system searches the artist, artist association, album and genre tables retrieving music items that are related to the content inputs music item. Each item found is added to the content result table with the associated relationship weight.

In this case, Pet Shop Boys belongs to the genres British Pop and 1980s Dance. These two genres are added to the content result table. The Pet Shop Boys are like the group New Order using the Artist Association table. The Pet Shop Boys have an album that has been rated highly called Bilingual. These items are all related to the Pet Shop Boys and are added to the Content Result Table.

Collaborative Recommendation

The system accesses the items in the favorites input table and converts them into a vector stored in memory. The vector is an array-based representation of the favorites input table that contains the item and user rating for that item.

In this case the vector contains, as shown in FIG. 5, Pet Shop Boys, New Order, and the Cranberries.

The system accesses the Cluster table. The cluster table contains a finite number of vectors that represent predefined clusters of users. The cluster table is used to improve the performance of the system by not requiring the system to compare the user vector with every other user vector. The system accesses the first vector in the Cluster table and performs a correlation algorithm, detailed above, to determine the correlation between the cluster and the user. In this case the cluster is Dance and the correlation is 94%.

If the correlation were higher than the current highest, which it would be, as the high would be set to zero initially; the cluster is added to the target cluster table.

The system then checks if there is more cluster vectors in the cluster table. If there are it loops over the remaining clusters, in this case, Heavy Metal and Rock and Roll, calculating the cluster vector's correlation with the user vector, comparing the correlation to the highest correlation and replacing the vector in the target cluster table with the cluster vector being processed (if the correlation is equal to the highest correlation then the target cluster table will contain two vectors or more). In this case, neither of the remaining vectors correlates better with the user's vector than the Dance cluster.

The system has now determined that the user best fits into the cluster called Dance and can narrow down the search for matching users to a subset of the users very quickly. Users can be related to many clusters if they have diverse musical tastes.

Once the system has determined the target cluster for the current user, it updates the user profile table linking the determined target clusters to the user and time stamping the entries. This updating of the user profile allows the system, for performance benefits, to skip the cluster determination steps if the requests falls within the time-frame for the user's cluster link time-stamps to be valid. In this example case, the step has been ignored to provide a more detailed example of the process.

The system now accesses the first vector in the target cluster table, Dance. The system then searches the user profile table for the first user(s) linked to the Dance cluster, in this case John and David. The system then calculates the correlation between the selected user profile and the current users profile: John (89%), David (75%).

If the correlation meets the correlation threshold, indicating similar tastes, the system would compare the two user profiles, identifying any items contained in the user profile vector that were not present in the current user profile. A weight for each item would be determined by multiplying the correlation with the rating to give the correlated rating weight.

If the correlated rating weight is above the correlation weighted rating threshold, indicating the user is highly likely to like the item, the item would be added to the collaborative result table. If the item already exists in the table, the stored rating would be replaced by the average of the two ratings.

The system would then check if there were more user profiles linked to the target cluster table. If there were, the system would access the remaining user vectors, processing each as above.

Once the system has completed processing each user linked to the target cluster, the system would check if any target clusters remained in the target cluster table. If there were, the system would process each cluster, correlating the users in the cluster with the current user and determining items which are highly likely to be liked by the current user.

At this point, the system has completed the collaborative filtering process. A collaborative result table exists which contains music items and their associated correlation weighted rating, which is an indicator of how likely the user is to like the item.

Sort and Display

Once the content related items have been added to the content result table and the collaborative filtering generated items have been added to the collaborative result table, the system combines the two tables together, removing duplicates (averaging the rating weights).

The items in the result table are then compared with the users favorite items table with any duplicates removed from the result table. This ensures that the system does not display items the user has already rated in the recommendations.

If there are no items in the results table, the system displays a "no results found" page. If there are items in the result table, the system sorts these items in descending order using the weight as the key and displays the results to the user. The items with the highest weight are the items most strongly recommended to the user, hence the sort key.

The user will be able to explore further the recommendations by providing additional rating information to the system. The can use the list of results as the basis for subsequent decisions as to which items to sample, purchase, or consume.

While the embodiments set forth above are discussed in terms of recommending musical compact discs, the present invention can also be used to recommend other items, such as videos, digital music (e.g. MP3 files), television shows, books and other consumer entertainment media content.

In view of the above description of the preferred embodiments of the present invention, many modifications and variations of the disclosed embodiments will be readily appreciated by those of skill in the art.

What is claimed is:

1. A content item referral system, executable by a computer, providing for the automated presentation of a set of recommended media-based content items in response to a query presented by a user, said content item referral system comprising:
   a) a weighted relation subsystem operable to provide weighted relationships data representing relative similarities between characteristic attributes of a predetermined set of content items;
   b) a referral sub-system, coupled to receive user profile data and said weighted relationship data, responsive to a user query, said referral system operative to perform a traversal of said user profile data and said weighted relationship data to provide an ordered list of content items relative to a predetermined content item; and c) an action analysis sub-system coupled to said referral system to receive user action behaviors correlated to content items considered by said user, said action analysis sub-system providing said user profile data to said referral sub-system.

2. The content referral system of claim 1 wherein a user profile sub-system stores said user profile data in a form reflecting weighted relationships representing relative similarities between characteristic attributes of a user considered set of content items and wherein said referral sub-system is operable to combine said user profile data with said weighted relationship data.

3. The content referral system of claim 2 wherein said referral sub-system is operable as a graph traversal system over said combined user profile data and said weighted relationship data.

4. The content referral system of claim 3 wherein said user considered set of content items is a subset of said predetermined set of content items.

5. A method of providing media content recommendations through a computer server system connected to a network communications system, wherein said computer server system has access to a first database of media content items including media content and related information and a media content filter identifying and providing qualifying attribute relationship data for media content items within said first database, and wherein the media content recommendations are particularly tailored to the personalized interests of a user, said method comprising the steps of:

a) presenting media content items through a network-connected interface to a predetermined user for review and consideration of potential personal interest;

b) monitoring the consideration of said media content items implied through the user directed navigation among the presented media content items and user requests for related information;

c) collecting data from said step of monitoring to develop a user weighted data set reflective of said predetermined user's relative consideration of said media content items; and d) evaluating said user weighted data set in combination with said media content filter to identify a set of media content items accessible from said first database for presentation to said predetermined user consistent with said step of presenting.

6. The method of claim 5 wherein said step of collecting data further provides for the progressive refinement of said user weighted data set, whereby said step of evaluating progressively provides said set of media content items more closely tailored to the personalized interests of said predetermined user.

7. The method of claim 6 wherein said step of collecting data includes identifying the occurrence of predetermined actions taken by said predetermined user and determining selectively the durations of said predetermined actions relative to different media content items, and wherein said predetermined actions taken and the durations of said predetermined actions are incorporated into said user data set to reflect said predetermined user's relative consideration of said media content items.

8. The method of claim 7 wherein said step of evaluating utilizes said user weighted data set to extrapolate through the relationships identified through said media content filter to identify said set of media content items.

9. The method of claim 8 wherein said step of evaluating operates as a graph traversal over the media content items related through said media content filter where the weighting data of said media content filter are modified to reflect said user weighted data set.

10. A content referral server system supporting, via a communications network, remote access, by a client system, to information relating, based on the similarity of characteristic attributes of specific instances of such content, different content items served by said content referral server system, said content referral server system comprising:

a) a content relations system that provides access to weighted content relationship information defining similarities between characteristic attributes of content referenceable by said content relations system; and b) a profiling system that collects profiling information reflecting the navigational actions of a user of said client system in accessing said content referral server system, wherein said profiling system provides profile data combinable with said weighted content relationship information relative to content referenceable by said content relations system and selectable by said user of said client system.

11. The content referral server system of claim 10 wherein said profiling system provides profile data combinable with said weighted content relationship information relative to a characteristic attribute of the content selectable by said user of said client system.

12. The content referral server system of claim 11 wherein said profiling information reflects explicit indications of interest and implicit indications of interest in particular instances of content.

13. The content referral server system of claim 12 wherein said implicit indications of interest are derived from the selection and duration of sampling of particular instances of content.

14. A content item referral system, executable by a computer, providing for the automated presentation of a set of recommended media content items in response to a query presented by a user, said content item referral system comprising:

a) a first database storing weighted relationships data representing relative similarities between characteristic attributes of a predetermined set of content items;

b) a second database storing user profile data including weighted preferences with respect to a profile respective set of content items;

c) a referral generation system, coupleable to said first database and said second database to access said weighted relationship data and said user profile data, wherein said referral generation system is responsive to a user query to define a graph traversal of said weighted relationship data combined with said user profile data and qualified by a weighted rating and confidence level at predetermined graph traversal steps to provide an ordered list of content items responsive to sold user query and having a predetermined minimum weighted rating and confidence level.

15. The content item referral system of claim 14 wherein said content item referral system is interactively responsive to said user to receive said user query and user input representing user action behaviors and wherein said content item referral system further comprises a profile update system coupled to said second database to update user profile data corresponding to said user in response to user action behaviors correlated to content items considered by said user.

16. The content item referral system of claim 15 wherein said user action behaviors provide predetermined attributed data correlated to content items considered by said user, wherein an update weighted preference is determinable from said predetermined attributed data, and wherein said profile update system updates said second database with said updated weighted preference.

17. The content item referral system of claim 16 wherein said user action behaviors include navigational and content item selection actions.

18. The content item referral system of claim 17 wherein said attributed data defines an implicit level of interest by said user in a predetermined content item.

19. A content item referral system executable by a server computer system coupleable to a communications network and interactively responsive to user actions in connection with the review and selection of media content items through distributed client computer systems, including the sampling of media content items, to provide automated generation of recommended sets of media content items, said content item referral system comprising:

a) an expert database containing attributed expert weighting data defining a first node connected network describing a defined set of content items;

b) a user profile database containing a plurality of user profiles, wherein each said user profile includes attributed personalized weighting data for a respective subset of said defined set of content items, wherein said attributed personalized weighting data is derived from explicit and implicit user actions correlated to said plurality of user profiles, and wherein said attributed personalized weighing data defines a second node connected network;

c) a referral system, coupled to said expert database and said user profile database, responsive to a user query to provide a list of recommended media content items to evaluate a plurality of traversal paths through said first and second node connected networks qualified by a combination of said attributed expert weighting data and said attributed personalized weighting data having at least a determined minimum aggregate weighting, the terminal nodes of said traversal paths representing said list of recommended media content items.

20. The content item referral system of claim 19 wherein said referral system is responsive to group behavioral data reflecting explicit and implicit user actions correlated to content items within said set of content items.

21. The content item referral system of claim 20 further comprising a weighting filter coupled between said expert database and said referral system, said weighting filter providing for the normalization of said attributed expert weighting data with respect to said attributed personalized weighting data.

22. The content item referral system of claim 21 wherein the normalization provided by said weighting filter is derived from said group behavioral data.

* * * * *